US009827558B2

(12) United States Patent
Yanagawa et al.

(10) Patent No.: US 9,827,558 B2
(45) Date of Patent: Nov. 28, 2017

(54) CATALYST FOR PRODUCTION OF HYDROCARBONS AND METHOD OF PRODUCING HYDROCARBONS

(75) Inventors: Shinichiro Yanagawa, Tokyo (JP); Masahide Kobayashi, Tokyo (JP); Kazuaki Hayasaka, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 221 days.

(21) Appl. No.: 13/574,410

(22) PCT Filed: Jan. 20, 2011

(86) PCT No.: PCT/JP2011/050998
§ 371 (c)(1),
(2), (4) Date: Oct. 4, 2012

(87) PCT Pub. No.: WO2011/090124
PCT Pub. Date: Jul. 28, 2011

(65) Prior Publication Data
US 2013/0015102 A1    Jan. 17, 2013

(30) Foreign Application Priority Data
Jan. 20, 2010 (JP) ................................. 2010-010261

(51) Int. Cl.
B01J 29/18    (2006.01)
B01J 29/06    (2006.01)
B01J 29/08    (2006.01)
B01J 37/28    (2006.01)
B01J 29/70    (2006.01)
C10G 11/18    (2006.01)
B01J 37/00    (2006.01)

(52) U.S. Cl.
CPC .............. B01J 29/18 (2013.01); B01J 29/06 (2013.01); B01J 29/061 (2013.01); B01J 29/08 (2013.01); B01J 29/082 (2013.01); B01J 29/084 (2013.01); B01J 29/085 (2013.01); B01J 29/087 (2013.01); B01J 29/088 (2013.01); B01J 29/7007 (2013.01); B01J 29/7057 (2013.01); B01J 37/28 (2013.01); C10G 11/18 (2013.01); B01J 37/0009 (2013.01); B01J 2229/18 (2013.01); B01J 2229/183 (2013.01); B01J 2229/186 (2013.01); B01J 2229/36 (2013.01); B01J 2229/37 (2013.01); C10G 2300/107 (2013.01); C10G 2400/20 (2013.01); C10G 2400/30 (2013.01)

(58) Field of Classification Search
USPC .................... 502/60, 61, 73, 78, 79
See application file for complete search history.

(56) References Cited

U.S. PATENT DOCUMENTS

| 3,308,069 | A | * | 3/1967 | Rosinski et al. ................. 502/62 |
| 4,088,706 | A | * | 5/1978 | Kaeding ........................ 585/408 |
| 4,090,949 | A | | 5/1978 | Owen et al. |
| 4,834,867 | A | | 5/1989 | Gilson |
| 4,985,384 | A | * | 1/1991 | Gilson ........................... 502/61 |
| 5,177,284 | A | * | 1/1993 | Le et al. ......................... 585/455 |
| 5,231,064 | A | * | 7/1993 | Absil et al. ..................... 502/68 |
| 5,833,840 | A | * | 11/1998 | Absil et al. ................... 208/113 |
| 2008/0293561 | A1 | * | 11/2008 | Long ........................ B01J 29/06 502/65 |
| 2009/0139898 | A1 | * | 6/2009 | Long et al. ..................... 208/46 |
| 2009/0288985 | A1 | | 11/2009 | Long et al. |
| 2009/0325785 | A1 | | 12/2009 | Moscoso et al. |

FOREIGN PATENT DOCUMENTS

| EP | 1762299 A1 | 3/2007 |
| JP | 02-184517 A | 7/1990 |
| JP | 03-002128 A | 1/1991 |
| JP | 03-026791 A | 2/1991 |
| JP | 03-052993 A | 3/1991 |
| JP | 04-504577 T | 8/1992 |
| JP | H08-508970 A | 9/1996 |
| JP | H08-269464 A | 10/1996 |
| JP | 2007-154151 A | 6/2007 |
| JP | 2008-508084 A | 3/2008 |
| JP | 2008-127542 A | 6/2008 |
| JP | 2008-138187 A | 6/2008 |
| JP | 2009-073919 A | 4/2009 |
| JP | 2009-235247 A | 10/2009 |
| JP | 2009-235248 A | 10/2009 |
| JP | 2010-001462 A | 1/2010 |
| JP | 2010-001463 A | 1/2010 |
| WO | 9108998 A1 | 6/1991 |
| WO | 9421378 A1 | 9/1994 |
| WO | 1995/021693 A1 | 8/1995 |

OTHER PUBLICATIONS

Extended European Search Report dated Jan. 28, 2014 in EP Application No. 11734730.2.
Costa et al, "BEA and MORE as additives for light olefins production," Applied Catalysis A: General, vol. 319, pp. 137-143 (2007).
Int'l Search Report dated Apr. 26, 2011 in Int'l Application No. PCT/JP2011/050998.
Office Action dated Jul. 14, 2015 in JP App No. 2011-505293.
Office Action dated Dec. 7, 2016 in EP Application No. 11734130.2.

* cited by examiner

Primary Examiner — Elizabeth Wood
(74) Attorney, Agent, or Firm — Panitch Schwarze Belisario & Nadel LLP

(57) ABSTRACT

A catalyst is provided for production of hydrocarbons including monocyclic aromatic hydrocarbons having a carbon number of 6 to 8 and aliphatic hydrocarbons having a carbon number of 3 to 4 from feedstock in which a 10 vol % distillation temperature is 140° C. or higher and a 90 vol % distillation temperature is 380° C. or lower. The catalyst includes crystalline aluminosilicate including large-pore zeolite having a 12-membered ring structure.

5 Claims, No Drawings

CATALYST FOR PRODUCTION OF HYDROCARBONS AND METHOD OF PRODUCING HYDROCARBONS

CROSS-REFERENCE TO RELATED APPLICATION

This application is a Section 371 of International Application No. PCT/JP2011/050998, filed Jan. 20, 2011, which was published in the Japanese language on Jul. 28, 2011, under International Publication No. WO 2011/090124 A1, and the disclosure of which is incorporated herein by reference.

TECHNICAL FIELD

The present invention relates to a catalyst for producing hydrocarbons and a method of producing hydrocarbons, which are capable of producing monocyclic aromatic hydrocarbons having a carbon number of 6 to 8 and aliphatic hydrocarbons having a carbon number of 3 to 4 from oil containing a large amount of polycyclic aromatic hydrocarbons.

Priority is claimed on Japanese Patent Application No. 2010-010261, filed Jan. 20, 2010, the content of which is incorporated herein by reference.

BACKGROUND ART

Light cycle oil (hereinafter, referred to as "LCO"), which is cracked light oil produced by a fluid catalytic cracking unit, contains a large amount of polycyclic aromatic hydrocarbons, and has been used as light oil or heavy oil. However, in recent years, investigations have been conducted to obtain, from LCO, useful components (for example, monocyclic aromatic hydrocarbons, liquefied petroleum gas, and the like) offering significant added value.

For example, Patent Document 1 to Patent Document 3 disclose methods of producing monocyclic aromatic hydrocarbons (such as benzene, toluene, xylene and ethylbenzene) from polycyclic aromatic hydrocarbons contained in large amounts within LCO and the like by using zeolite catalysts.

In addition, as a method of producing monocyclic aromatic hydrocarbons through reaction using zeolite catalysts, Patent Document 4 discloses a method of producing monocyclic aromatic hydrocarbons from aromatic compounds having a carbon number of 9 or more by using beta-type zeolite, which has a 12-membered ring structure and a large pore size, as a catalyst.

Patent Document 5 discloses a method of producing monocyclic aromatic hydrocarbons from paraffin-based hydrocarbons having a carbon number of 2 to 12 by using beta-type zeolite as a catalyst.

CITATION LIST

Patent Document

[Patent Document 1] Japanese Unexamined Patent Application, First publication No. H3-2128
[Patent Document 2] Japanese Unexamined Patent Application, First publication No. H3-52993
[Patent Document 3] Japanese Unexamined Patent Application, First publication No. H3-26791
[Patent Document 4] Published Japanese Translation No. H4-504577 of the PCT International Publication
[Patent Document 5] Japanese Unexamined Patent Application, First publication No. H2-184517

DISCLOSURE OF INVENTION

Problems to be Solved by the Invention

However, in the methods disclosed in Patent Document 1 to Patent Document 5, the yield of the aliphatic hydrocarbons having a carbon number of 3 to 4 as distilled components of the liquefied petroleum gas is low, or the sum of the yield of monocyclic aromatic hydrocarbons having a carbon number of 6 to 8 and aliphatic hydrocarbons having a carbon number of 3 to 4 is low. That is, both of the monocyclic aromatic hydrocarbons having a carbon number of 6 to 8 and the aliphatic hydrocarbons having a carbon number of 3 to 4 are not sufficiently obtained. Furthermore, the methods disclosed in Patent Document 4 and Patent Document 5 are not a method of obtaining both of the monocyclic aromatic hydrocarbons having a carbon number of 6 to 8 and the aliphatic hydrocarbons having a carbon number of 3 to 4 from LCO.

An object of the invention is to provide a catalyst for producing hydrocarbons and a method of producing hydrocarbons, which are capable of producing monocyclic aromatic hydrocarbons having a carbon number of 6 to 8 and aliphatic hydrocarbons having a carbon number of 3 to 4 with high yield of the sum thereof, and which are capable of sufficiently obtaining both of the monocyclic aromatic hydrocarbons having a carbon number of 6 to 8 and the aliphatic hydrocarbons having a carbon number of 3 to 4, when producing the monocyclic aromatic hydrocarbons having a carbon number of 6 to 8 and the aliphatic hydrocarbons having a carbon number of 3 to 4 from feedstock in which a 10 vol % distillation temperature is 140° C. or higher and a 90 vol % distillation temperature is 380° C. or lower.

Means for Solving the Problem (1) According to an embodiment of the invention, a catalyst is provided for production of hydrocarbons including monocyclic aromatic hydrocarbons having a carbon number of 6 to 8 and aliphatic hydrocarbons having a carbon number of 3 to 4 from feedstock in which a 10 vol % distillation temperature is 140° C. or higher and a 90 vol % distillation temperature is 380° C. or lower. The catalyst includes crystalline aluminosilicate including large-pore zeolite having a 12-membered ring structure.

(2) The catalyst for production of hydrocarbons according to (1), wherein the large-pore zeolite may be zeolite of any type selected from a BEA type, an FAU type, and an MOR type.

(3) The catalyst for production of hydrocarbons according to (1) or (2), wherein the large pore zeolite may be BEA-type zeolite.

(4) The catalyst for production of hydrocarbons according to any one of (1) to (3), wherein the catalyst may further contain phosphorus.

(5) According to another embodiment of the invention, a method of producing hydrocarbons is provided. The method includes bringing feedstock in which a 10 vol % distillation temperature is 140° C. or higher and a 90 vol % distillation temperature is 380° C. or lower into contact with the catalyst for production of hydrocarbons according to any one of (1) to (4).

(6) The method of producing hydrocarbons according to (5), wherein as the feedstock, light cycle oil produced by a fluid catalytic cracking unit may be used.

(7) The method of producing hydrocarbons according to (5) or (6), wherein the feedstock may be brought into contact with the catalyst for production of hydrocarbons in a fluidized bed reaction unit.

(8) The method of producing hydrocarbons according to any one of (5) to (7), wherein the feedstock may be brought into contact with the catalyst for production of hydrocarbons at a reaction temperature of 450 to 600° C.

Advantageous Effects of the Invention

According to the catalyst for producing hydrocarbons and the method of producing hydrocarbons, it is possible to produce monocyclic aromatic hydrocarbons having a carbon number of 6 to 8 and aliphatic hydrocarbons having a carbon number of 3 to 4 with high yield of the sum thereof, and it is possible to sufficiently obtain both of the monocyclic aromatic hydrocarbons having a carbon number of 6 to 8 and the aliphatic hydrocarbons having a carbon number of 3 to 4, when producing the monocyclic aromatic hydrocarbons having a carbon number of 6 to 8 and the aliphatic hydrocarbons having a carbon number of 3 to 4 from feedstock in which a 10 vol % distillation temperature is 140° C. or higher and a 90 vol % distillation temperature is 380° C. or lower.

BEST MODE FOR CARRYING OUT THE INVENTION (Catalyst for Production of Hydrocarbon)

A catalyst for production of hydrocarbons according to this embodiment (hereinafter, abbreviated as "catalyst") is used for producing monocyclic aromatic hydrocarbons having a carbon number of 6 to 8 and aliphatic hydrocarbons having a carbon number of 3 to 4 from feedstock containing polycyclic aromatic hydrocarbons and saturated hydrocarbons, and contains crystalline aluminosilicate.

(Crystalline Aluminosilicate)

In this embodiment, the crystalline aluminosilicate contains large-pore zeolite having a 12-membered ring structure.

As the large-pore zeolite having a 12-membered ring structure, for example, zeolites having a framework type of an AFI type, an ATO type, a BEA type, a CON type, an FAU type, a GME type, an LTL type, an MOR type, an MTW type, and an OFF type may be exemplified. Among these, the MOR type, the BEA type, and the FAU type are preferable from an industrially usable aspect, and the BEA type is more preferable because the sum of the yield of the monocyclic aromatic hydrocarbons having a carbon number of 6 to 8 and the aliphatic hydrocarbons having a carbon number of 3 to 4 may be relatively raised.

In addition, all of the framework types of the zeolites that are shown in this embodiment are structure codes based on the definition of the International Zeolite Association.

In addition to the large-pore zeolite, the crystalline aluminosilicate may contain small-pore zeolite having a structure of up to 10-membered ring, intermediate-pore zeolite having a 10-membered ring structure, and ultra-large-pore zeolite having a structure of a 14-membered ring or more.

Here, as the small-pore zeolite, for example, zeolites having a framework type of an ANA type, a CHA type, an EM type, a GIS type, a KFI type, an LTA type, an NAT type, a PAU type, and a YUG type.

As the intermediate-pore zeolite, for example, zeolites having a framework type of an AEL type, an EUO type, an FER type, an HEU type, an MEL type an MFI type, an NES type, a TON type, and a WEI type may be exemplified.

As the ultra-large-pore zeolite, for example, zeolites having a framework type of a CLO type, and a VPI type may be exemplified.

In a case where the catalyst is used as a fixed bed catalyst, the content of the crystalline aluminosilicate is preferably 60 to 100% by mass on the basis of 100% by mass of the entirety of the catalyst, and more preferably 70 to 100% by mass, and still more preferably 90 to 100% by mass. When the content of the crystalline aluminosilicate is 60% by mass or more, the sum of the yield of the monocyclic aromatic hydrocarbons having a carbon number of 6 to 8 and the aliphatic hydrocarbons having a carbon number of 3 to 4 may be sufficiently raised.

In a case where the catalyst is used as a fluidized bed catalyst, the content of the crystalline aluminosilicate is preferably 20 to 60% by mass on the basis of 100% by mass of the entirety of the catalyst, and more preferably 30 to 60% by mass, and still more preferably 35 to 60% by mass. When the content of the crystalline aluminosilicate is 20% by mass or more, the sum of the yield of the monocyclic aromatic hydrocarbons having a carbon number of 6 to 8 and the aliphatic hydrocarbons having a carbon number of 3 to 4 may be sufficiently raised. When the content of the crystalline aluminosilicate exceeds 60% by mass, the content of a binder that may be mixed with the catalyst becomes small, and thus may be not appropriate as the fluidized bed catalyst.

In addition, the content of the large-pore zeolite in the crystalline aluminosilicate is preferably 50 to 100% by mass on the basis of 100% by mass of the entirety of the crystalline aluminosilicate, and more preferably 70 to 100% by mass, and still more preferably 90 to 100% by mass. When the content of the large-pore zeolite is 50% by mass or more, the sum of the yield of the monocyclic aromatic hydrocarbons having a carbon number of 6 to 8 and the aliphatic hydrocarbons having a carbon number of 3 to 4 may be sufficiently raised.

(Other Components)

The catalyst may contain gallium and/or zinc as necessary. When gallium and/or zinc is contained, a production ratio of the monocyclic aromatic hydrocarbons having a carbon number of 6 to 8 tends to be increased.

As a method used to incorporate gallium into the catalyst, a type in which gallium is incorporated in a lattice framework of the crystalline aluminosilicate (crystalline aluminogallo silicate), a type in which gallium is supported by the crystalline aluminosilicate (gallium-supporting crystalline aluminosilicate), and a type including both of these types may be exemplified.

As a method used to incorporate zinc into the catalyst, a type in which zinc is incorporated in a lattice framework of the crystalline aluminosilicate (crystalline aluminozincosilicate), a type in which zinc is supported by the crystalline aluminosilicate (zinc-supporting crystalline aluminosilicate), and a type including both of these types may be exemplified.

The crystalline aluminogallosilicate and the crystalline aluminozincosilicate have a structure in which $SiO_4$, $AlO_4$, and $GaO_4/ZnO_4$ structures have a tetrahedral coordination in a framework. In addition, the crystalline aluminogallosilicate and the crystalline aluminozincosilicate may be obtained, for example, by gel crystallization through hydrothermal synthesis, by a method in which gallium or zinc is inserted into the lattice framework of the crystalline aluminosilicate, or by a method in which aluminum is inserted into the lattice framework of crystalline gallosilicate or crystalline zincosilicate.

The gallium-supporting crystalline aluminosilicate may be obtained by supporting gallium on a crystalline aluminosilicate using a conventional method such as an ion-exchange method or impregnation method. There are no particular limitations on the gallium source used in these methods, and examples include gallium salts such as gallium nitrate and gallium chloride, and gallium oxide.

The zinc-supporting crystalline aluminosilicate may be obtained by supporting zinc on a crystalline aluminosilicate using a known method such as an ion-exchange method or impregnation method. There are no particular limitations on the zinc source used in these methods, and examples include zinc salts such as zinc nitrate and zinc chloride, and zinc oxide.

In a case where the catalyst contains gallium and/or zinc, the lower limit of the content of gallium and/or zinc is preferably 0.01% by mass or more on the basis of 100% by mass of the total mass of the crystalline aluminosilicate, and more preferably 0.05% by mass or more. On the other hand, the upper limit thereof is preferably 5.0% by mass or less, and more preferably 1.5% by mass or less. When the content of gallium and/or zinc is 0.01% by mass or more, a production ratio of the monocyclic aromatic hydrocarbons having a carbon number of 6 to 8 may be relatively raised, and when the content is 5.0% by mass or less, the sum of the yield of the monocyclic aromatic hydrocarbons having a carbon number of 6 to 8 and the aliphatic hydrocarbons having a carbon number of 3 to 4 may be relatively raised.

In addition, the catalyst may contain phosphorus and/or boron as necessary. When phosphorus and/or boron is contained, a decrease over time in the sum of the yield of the monocyclic aromatic hydrocarbons having a carbon number of 6 to 8 and the aliphatic hydrocarbons having a carbon number of 3 to 4 may be prevented, and the formation of coke on the surface of the catalyst may be suppressed.

There are no particular limitations on a method of incorporating phosphorus in the catalyst, and examples thereof include a method in which phosphorus is made to be supported on crystalline aluminosilicate, crystalline aluminogallosilicate, or crystalline aluminozincosilicate by using an ion-exchange method, impregnation method, or the like, a method in which a phosphorus compound is incorporated during synthesis of the zeolite, and a part in the framework of the crystalline aluminosilicate is substituted with phosphorus, a method in which a crystallization promoter containing phosphorus is used during synthesis of the zeolite, and the like. Although there are no particular limitations on a phosphate ion-containing aqueous solution used at that time, a solution, which is prepared by dissolving phosphoric acid, diammonium hydrogen phosphate, ammonium dihydrogen phosphate, or another water-soluble phosphate salt in water at an arbitrary concentration, may be preferably used.

There are no particular limitations on a method of incorporating boron in the catalyst, and examples thereof include a method in which boron is made to be supported on crystalline aluminosilicate, crystalline aluminogallosilicate, or crystalline aluminozincosilicate by using an ion-exchange method, impregnation method, or the like, a method in which a boron compound is incorporated during synthesis of the zeolite, and a part in the framework of the crystalline aluminosilicate is substituted with boron, a method in which a crystallization promoter containing boron is used during synthesis of the zeolite, and the like.

In a case where the catalyst contains phosphorus and/or boron, the lower limit of the amount of phosphorus and/or boron is preferably 0.1% by mass or more on the basis of 100% by mass of the total mass of the crystalline aluminosilicate, and more preferably 0.2% by mass or more. On the other hand, the upper limit thereof is preferably 5.0% by mass or less, and more preferably 3.0% by mass or less. When the amount of phosphorus and boron is 0.1% by mass or more, a decrease over time in the yield may be further prevented, and when the content is 5.0% by mass or less, the yields of the monocyclic aromatic hydrocarbons having a carbon number of 6 to 8 and the aliphatic hydrocarbons having a carbon number of 3 to 4 may be relatively raised.

(Form)

The catalyst has a powder form, a granular form, or a pellet form, or the like depending on a reaction system. For example, in the case of a fluidized bed, the catalyst has the powder form, whereas in the case of a fixed bed, the catalyst has the granular form or the pellet form.

In the case of obtaining the catalyst having the granular form or the pellet form, an oxide inert to the catalyst is mixed with the catalyst as a binder as necessary, and then the resultant mixture may be molded with various molding machines.

In a case where the catalyst of this embodiment contains the binder or the like, binders containing phosphorus and/or boron may be used. At this time, in the catalyst, the amount of phosphorus and/or boron that is contained in the crystalline aluminosilicate (% by mass of phosphorus and/or boron on the basis of 100% by mass of the total mass of the crystalline aluminosilicate) is preferably 0.1 to 5.0% by mass. An amount of phosphorus and/or boron that is contained in the crystalline aluminosilicate represents an amount of phosphorus and/or boron that acts on the crystalline aluminosilicate.

In addition, in a case where the catalyst contains a binder or the like, the catalyst may be produced by mixing the binder or the like, and gallium and/or zinc supporting crystalline aluminosilicate or crystalline aluminogallosilicate and/or crystalline aluminozincosilicate, and then by adding phosphorus and/or boron to the resultant mixture. At this time, in the catalyst, the amount of phosphorus and/or boron that is contained in the crystalline aluminosilicate (% by mass of phosphorus and/or boron on the basis of 100% by mass of the total mass of the crystalline aluminosilicate) is preferably 0.1 to 5.0% by mass.

As the binder or the like that is mixed with the catalyst, an inorganic oxide may be used, and as the binder or the like, a material containing phosphorus and/or boron may be used. By also considering the amount of phosphorus and/or boron that acts on the crystalline aluminosilicate in the case of using the binder or the like that contains phosphorus and/or boron, it is preferable that the amount of phosphorus and/or boron with respect to the total weight of the catalyst be 0.1 to 10% by mass, and the lower limit thereof be more preferably 0.5% by mass or more. The upper limit thereof is more preferably 9% by mass or less, and still more preferably 8% by mass or less. When the amount of phosphorus and/or boron with respect to the total weight of the catalyst is 0.1% by mass or more, a decrease over time in the yield of the monocyclic aromatic hydrocarbons may be prevented, and when the content is 10% by mass or less, the yield of the monocyclic aromatic hydrocarbons may be raised.

(Method of Producing Hydrocarbons)

The method of producing hydrocarbons according to this embodiment is a method in which feedstock contacts with the above-mentioned catalyst to react therewith. The reaction in this embodiment is a method in which acid points of the catalyst and the feedstock are brought into contact with each other, and thus through various reactions including decomposition, dehydrogenation, cyclization, hydrogen transfer, and the like, the polycyclic aromatic hydrocarbons are cleaved and are converted into monocyclic aromatic hydrocarbons having a carbon number of 6 to 8, and the aliphatic hydrocarbons having a carbon number of 3 to 4 are generated.

Here, the acid points are points which are, on a catalyst support, capable of releasing protons or capable of accepting electrons, and which are active points exhibiting acidity.

(Feedstock)

The feedstock that is used in this embodiment is oil in which a 10 vol % distillation temperature is 140° C. or higher and a 90 vol % distillation temperature is 380° C. or lower. In the oil in which the 10 vol % distillation temperature is lower than 140° C., BTX (Benzene, Toluene, and Xylene) is produced from light oil, and thus this is not in keeping with the gist of this embodiment. In addition, in the case of using oil in which the 90 vol % distillation temperature is higher than 380° C., the sum of the yield of the monocyclic aromatic hydrocarbons having a carbon number of 6 to 8 and the aliphatic hydrocarbons having a carbon number of 3 to 4 is low and an amount of deposited coke on the catalyst increases, such that there is a tendency for activity of the catalyst to rapidly decrease.

It is preferable that the 10 vol % distillation temperature of the feedstock be 150° C. or higher and the 90 vol % distillation temperature of the feedstock be 360° C. or lower.

In addition, the 10 vol % distillation temperature and the 90 vol % distillation temperature described here represent values that are measured in accordance with JIS K2254 "Petroleum Products-Distillation Test Method".

As the feedstock in which the 10 vol % distillation temperature is 140° C. or higher and the 90 vol % distillation temperature is 380° C. or lower, for example, LCO produced by a fluid catalytic cracking unit, coal liquefaction oil, hydrocracked refined oil from heavy oil, straight-run kerosene, straight-run light oil, coker kerosene, coker light oil, and hydrocracked refined oil from oil sands may be exemplified.

In addition, when the feedstock contains a large amount of polycyclic aromatic hydrocarbons, the sum of the yield of the monocyclic aromatic hydrocarbons having a carbon number of 6 to 8 and the aliphatic hydrocarbons having a carbon number of 3 to 4 tends to decrease, and therefore the content of polycyclic aromatic hydrocarbons (the polycyclic aromatic content) in the feedstock is preferably 50% by volume or less, and more preferably 30% by volume or less.

In addition, the polycyclic aromatic content described here represents the total value of the content of bicyclic aromatic hydrocarbons (the bicyclic aromatic content) and the content of tricyclic or higher aromatic hydrocarbons (the tricyclic or higher aromatic content) measured in accordance with JPI-5S-49 "Petroleum Products—Determination of Hydrocarbon Types—High Performance Liquid Chromatography".

(Reaction System)

Examples of the reaction system used for bringing the feedstock into contact with the catalyst for reaction include a fixed bed, a moving bed and a fluidized bed. In this embodiment, since a heavy oil fraction is used as the raw material, the fluidized bed is preferable as it enables the coke deposited on the catalyst to be removed in a continuous manner and enables the reaction to proceed in a stable manner. A continuous regeneration-type fluidized bed, in which the catalyst is circulated between a reactor and a regenerator, and thus a reaction-regeneration cycle is continuously repeated, is more preferable. The feedstock when being brought into contact with the catalyst is preferably in a gaseous state. Furthermore, the raw material may be diluted with a gas as necessary. Furthermore, in a case where unreacted raw material occurs, this may be recycled as necessary.

(Reaction Temperature)

Although there are no particular limitations on the reaction temperature during contact of the feedstock with the catalyst for reaction, a reaction temperature is preferably 450 to 600° C., and more preferably 480 to 580° C. When the reaction temperature is 450° C. or higher, the feedstock may be easily made to react with the catalyst. In addition, when the reaction temperature is 450 to 600° C., the sum of the yield of the monocyclic aromatic hydrocarbons having a carbon number of 6 to 8 and the aliphatic hydrocarbons having a carbon number of 3 to 4 may be relatively raised.

(Reaction Pressure)

The reaction pressure during contact of the feedstock with the catalyst for reaction is preferably 1.0 MPaG or lower. When the reaction pressure is 1.0 MPaG or lower, the generation of by-product light gases may be prevented, and the proof pressure required for a reaction unit may be lowered.

(Contact Time)

There are no particular limitations on the contact time between the feedstock and the catalyst as long as a desired reaction actually proceeds, but in terms of the gas transit time across the catalyst, a time of 1 to 300 seconds is preferable. The lower limit for this time is more preferably 5 seconds or more, and the upper limit is more preferably 60 seconds or less. When the contact time is 1 second or more, reliable reaction may be achieved, and when the contact time is 300 seconds or less, deposition of carbonaceous matter on the catalyst due to coking or the like may be suppressed. Furthermore, the amount of light gas generated by cracking may also be suppressed.

In this embodiment, the sum of the yield of the monocyclic aromatic hydrocarbons having a carbon number of 6 to 8 and the aliphatic hydrocarbons having a carbon number of 3 to 4 is preferably 30% by mass or more, more preferably 35% by mass or more, and still more preferably 40% by mass. It is not preferable that the sum of the yield of the monocyclic aromatic hydrocarbons having a carbon number of 6 to 8 and the aliphatic hydrocarbons having a carbon number of 3 to 4 is lower than 30% by mass, because the low concentration of the desired products in a reaction mixture causes low recovery efficiency.

EXAMPLES

Hereinafter, the embodiment will be described in detail on the basis of examples and comparative examples, but this embodiment is not limited to these examples.

(Preparation of BEA-Type Zeolite)

BEA-type zeolite was prepared as described below according to a hydrothermal synthesis method in the related art.

59.1 g of a silicic acid ($SiO_2$: 89% by mass) was dissolved in 202 g of tetraethylammonium hydroxide aqueous solution (40% by mass) to prepare a first solution. This solution was added to a second solution that was prepared by dissolving 0.74 g of Al-pellets and 2.69 g of sodium hydroxide in 17.7 g of water.

The two solutions were mixed, thereby obtaining a reaction mixture having a composition (in terms of molar ratio of oxides) of 2.4 $Na_2O$-20.0 $(TEA)_2$-$Al_2O_3$-64.0 $SiO_2$-612 $H_2O$. This reaction mixture was placed in a 0.3 L autoclave, and was heated at 150° C. for 6 days. The obtained product was separated from the mother liquor and the separated product was cleaned with distilled water. From a result of X-ray diffraction analysis (apparatus model: Rigaku RINT-2500V) on the product, BEA-type zeolite was confirmed from XRD patterns.

Then, after being subjected to ion-exchange using ammonium nitrate aqueous solution (30% by mass), the BEA-type zeolite was baked at 550° C. for 3 hours, whereby proton-type BEA zeolite was obtained.

Example 1

The proton-type BEA zeolite, which was prepared as the catalyst, was tablet-molded while applying a pressure of 39.2 MPa (400 kgf), and then the resultant tablets were coarsely crushed to have a uniform size of 20 to 28 mesh, whereby a granulated catalyst 1 was obtained.

Feedstock having properties shown in Table 1 and the catalyst were made to come into contact and react with each other under conditions of a reaction temperature of 550° C. and a reaction pressure of 0 MPaG by using a flow type reaction unit in which 10 ml of the catalyst 1 was filled in a reactor thereof. At this time, nitrogen as a diluting agent was introduced in order for the contact time between the feedstock and the catalyst to be 6.4 seconds. Under these conditions, reaction was carried out for 30 minutes, and thereby monocyclic aromatic hydrocarbons having a carbon number of 6 to 8 and aliphatic hydrocarbons having a carbon number of 3 to 4 were prepared. Then, composition analysis of the product was performed by an FID gas chromatography instrument that was directly connected to the reaction unit and the yields of the monocyclic aromatic hydrocarbons having a carbon number of 6 to 8 and the aliphatic hydrocarbons having a carbon number of 3 to 4 were measured. From this measurement, the sum of the yield of the monocyclic aromatic hydrocarbons having a carbon number of 6 to 8 and the aliphatic hydrocarbons having a carbon number of 3 to 4 was 44% by mass, and that of the aliphatic hydrocarbons having a carbon number of 3 to 4 was 21% by mass. Measurement results are shown in Table 2.

TABLE 1

| Properties of raw material | | | | Analysis method |
|---|---|---|---|---|
| Density (@15° C.) | | g/cm | 0.906 | JIS K 2249 |
| Kinetic viscosity (@30° C.) | | mm²/s | 3.640 | JIS K 2283 |
| Distillation properties | Initial distillation point | ° C. | 175.5 | JIS K 2254 |
| | 10 vol % distillation temperature | ° C. | 224.5 | |
| | 50 vol % distillation temperature | ° C. | 274.0 | |
| | 90 vol % distillation temperature | ° C. | 349.5 | |
| | End point | ° C. | 376.0 | |
| Compositional analysis | Saturated portion | % by volume | 35 | JPI-5S-49 |
| | Olefin portion | % by volume | 8 | |
| | Total aromatic portion | % by volume | 57 | |
| | Monocyclic aromatic portion | % by volume | 23 | |

TABLE 1-continued

| Properties of raw material | | | Analysis method |
|---|---|---|---|
| Bicyclic aromatic portion | % by volume | 25 | |
| Tricyclic or more aromatic portion | % by volume | 9 | |

Example 2

120 g of BEA-type zeolite was impregnated with 120 g of gallium nitrate aqueous solution in order for 0.2% by mass (on the basis of 100% by mass of the total mass of the crystalline aluminosilicate) of gallium to be supported, and then the resultant product was dried at 120° C. Then, the resultant dried product was baked under a stream of air at a high temperature of 780° C. for 3 hours, whereby gallium-supporting crystalline aluminosilicate was obtained. This gallium-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 2 was obtained.

In addition, the yields of the monocyclic aromatic hydrocarbons having a carbon number of 6 to 8 and the aliphatic hydrocarbons having a carbon number of 3 to 4 were measured by using the catalyst 2 in place of the catalyst 1 in Example 1. From this measurement, the sum of the yield of the monocyclic aromatic hydrocarbons having a carbon number of 6 to 8 and the aliphatic hydrocarbons having a carbon number of 3 to 4 was 37% by mass, and that of the aliphatic hydrocarbons having a carbon number of 3 to 4 was 17% by mass. Measurement results are shown in Table 2.

Example 3

120 g of BEA-type zeolite was impregnated with 120 g of gallium nitrate aqueous solution in order for 0.4% by mass (on the basis of 100% by mass of the total mass of the crystalline aluminosilicate) of gallium to be supported, and then the resultant product was dried at 120° C. Then, the resultant dried product was baked under a stream of air at a high temperature of 780° C. for 3 hours, whereby gallium-supporting crystalline aluminosilicate was obtained. This gallium-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 3 was obtained.

In addition, the yields of the monocyclic aromatic hydrocarbons having a carbon number of 6 to 8 and the aliphatic hydrocarbons having a carbon number of 3 to 4 were measured by using the catalyst 3 in place of the catalyst 1 in Example 1. From this measurement, the sum of the yield of the monocyclic aromatic hydrocarbons having a carbon number of 6 to 8 and the aliphatic hydrocarbons having a carbon number of 3 to 4 was 34% by mass, and that of the aliphatic hydrocarbons having a carbon number of 3 to 4 was 14% by mass. Measurement results are shown in Table 2.

Comparative Example 1

120 g of MFI-type zeolite was impregnated with 120 g of gallium nitrate aqueous solution in order for 0.4% by mass (on the basis of 100% by mass of the total mass of the crystalline aluminosilicate) of gallium to be supported, and then the resultant product was dried at 120° C. Then, the resultant dried product was baked under a stream of air at a high temperature of 780° C. for 3 hours, whereby gallium-supporting crystalline aluminosilicate was obtained. This gallium-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 4 was obtained.

In addition, the yields of the monocyclic aromatic hydrocarbons having a carbon number of 6 to 8 and the aliphatic hydrocarbons having a carbon number of 3 to 4 were measured by using the catalyst 4 in place of the catalyst 1 in Example 1. From this measurement, the sum of the yield of the monocyclic aromatic hydrocarbons having a carbon number of 6 to 8 and the aliphatic hydrocarbons having a carbon number of 3 to 4 was 41% by mass, and that of the aliphatic hydrocarbons having a carbon number of 3 to 4 was 1% by mass. Measurement results are shown in Table 2.

Comparative Example 2

120 g of MFI-type zeolite was impregnated with 120 g of gallium nitrate aqueous solution in order for 1.6% by mass (on the basis of 100% by mass of the total mass of the crystalline aluminosilicate) of gallium to be supported, and then the resultant product was dried at 120° C. Then, the resultant dried product was baked under a stream of air at a high temperature of 780° C. for 3 hours, whereby gallium-supporting crystalline aluminosilicate was obtained. This gallium-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 5 was obtained.

In addition, the yields of the monocyclic aromatic hydrocarbons having a carbon number of 6 to 8 and the aliphatic hydrocarbons having a carbon number of 3 to 4 were measured by using the catalyst 5 in place of the catalyst 1 in Example 1. From this measurement, the sum of the yield of the monocyclic aromatic hydrocarbons having a carbon number of 6 to 8 and the aliphatic hydrocarbons having a carbon number of 3 to 4 was 35% by mass, and that of the aliphatic hydrocarbons having a carbon number of 3 to 4 was 1% by mass. Measurement results are shown in Table 2.

and not containing the large-pore zeolite were used, the yield of the aliphatic hydrocarbons having a carbon number of 3 to 4 was low.

Examples 4, 5, and 6

In addition, the yields of the monocyclic aromatic hydrocarbons having a carbon number of 6 to 8 and the aliphatic hydrocarbons having a carbon number of 3 to 4 were measured in the same manner as Example 1 except that the reaction temperature in Example 1 was changed to 450° C. (Example 4), 500° C. (Example 5), and 600° C. (Example 6), respectively. The sum of the yield of the monocyclic aromatic hydrocarbons having a carbon number of 6 to 8 and the aliphatic hydrocarbons having a carbon number of 3 to 4 was 44% by mass in Example 4, 51% by mass in Example 5, and 32% by mass in Example 6, respectively and of the aliphatic hydrocarbons having a carbon number of 3 to 4 was 24% by mass in Example 4, 30% by mass in Example 5, and 9% by mass in Example 6, respectively. Measurement results are shown in Table 3.

Examples 7 and 8

In addition, the yields of the monocyclic aromatic hydrocarbons having a carbon number of 6 to 8 and the aliphatic hydrocarbons having a carbon number of 3 to 4 were measured in the same manner as Example 2 except that the reaction temperature in Example 2 was changed to 500° C. (Example 7) and 600° C. (Example 8), respectively. The sum of the yield of the monocyclic aromatic hydrocarbons having a carbon number of 6 to 8 and the aliphatic hydrocarbons having a carbon number of 3 to 4 was 40% by mass in Example 7 and 28% by mass in Example 8, respectively, and of the aliphatic hydrocarbons having a carbon number of 3 to 4 was 23% by mass in Example 7 and 6% by mass in Example 8, respectively. Measurement results are shown in Table 3.

Examples 9 and 10

In addition, the yields of the monocyclic aromatic hydrocarbons having a carbon number of 6 to 8 and the aliphatic hydrocarbons having a carbon number of 3 to 4 were measured in the same manner as Example 1 except that the reaction temperature in Example 3 was changed to 500° C. (Example 9) and 600° C. (Example 10), respectively. The

TABLE 2

| | Example 1 | Example 2 | Example 3 | Comparative Example 1 | Comparative Example 2 |
|---|---|---|---|---|---|
| Kind of zeolite | BEA | BEA | BEA | MFI | MFI |
| Content of gallium (% by mass) | 0 | 0.2 | 0.4 | 0.4 | 1.6 |
| Sum of yield of monocyclic aromatic hydrocarbons having a carbon number of 6 to 8 and aliphatic hydrocarbons having a carbon number of 3 to 4 (% by mass) | 44 | 37 | 34 | 41 | 35 |
| Yield of aliphatic hydrocarbons having a carbon number of 3 to 4 (% by mass) | 21 | 17 | 14 | 1 | 1 |

(Results)

In Examples 1 to 3 in which the catalysts 1 to 3 containing the large-pore zeolite were used, the sum of the yield of the monocyclic aromatic hydrocarbons having a carbon number of 6 to 8 and the aliphatic hydrocarbons having a carbon number of 3 to 4 was high, and the yield of the aliphatic hydrocarbons having a carbon number of 3 to 4 was high.

Conversely, in comparative examples 1 and 2 in which the catalysts 4 and 5 containing the intermediate-pore zeolite sum of the yield of the monocyclic aromatic hydrocarbons having a carbon number of 6 to 8 and the aliphatic hydrocarbons having a carbon number of 3 to 4 was 37% by mass in Example 9 and 24% by mass in Example 10, respectively, and of the aliphatic hydrocarbon having a carbon number of 3 to 4 was 20% by mass in Example 9 and 6% by mass in Example 10, respectively. Measurement results are shown in Table 3.

TABLE 3

| | Example 4 | Example 5 | Example 1 | Example 6 | Example 7 | Example 2 | Example 8 | Example 9 | Example 3 | Example 10 |
|---|---|---|---|---|---|---|---|---|---|---|
| Reaction temperature (° C.) | 450 | 500 | 550 | 600 | 500 | 550 | 600 | 500 | 550 | 600 |
| Sum of yield of monocyclic aromatic hydrocarbons having a carbon number of 6 to 8 and aliphatic hydrocarbons having a carbon number of 3 to 4 (% by mass) | 44 | 51 | 44 | 32 | 40 | 37 | 28 | 37 | 34 | 24 |
| Yield of aliphatic hydrocarbons having a carbon number of 3 to 4 (% by mass) | 24 | 30 | 21 | 9 | 23 | 17 | 6 | 20 | 14 | 6 |

(Results)

As shown in Table 3, even in the case of using any catalyst, when the reaction temperature is in a range of 450 to 600° C., it can be seen that the monocyclic aromatic hydrocarbons having a carbon number of 6 to 8 and the aliphatic hydrocarbons having a carbon number of 3 to 4 may be obtained with high yield.

Example 11

120 g of BEA-type zeolite was impregnated with 120 g of zinc nitrate aqueous solution in order for 0.4% by mass (on the basis of 100% by mass of the total mass of the crystalline aluminosilicate) of zinc to be supported, and then the resultant product was dried at 120° C. Then, the resultant dried product was baked under a stream of air at a high temperature of 780° C. for 3 hours, whereby zinc-supporting crystalline aluminosilicate was obtained. This zinc-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 6 was obtained.

In addition, the yields of the monocyclic aromatic hydrocarbons having a carbon number of 6 to 8 and the aliphatic hydrocarbons having a carbon number of 3 to 4 were measured by using the catalyst 6 in place of the catalyst 1 in Example 1. From this measurement, the sum of the yield of the monocyclic aromatic hydrocarbons having a carbon number of 6 to 8 and the aliphatic hydrocarbons having a carbon number of 3 to 4 was 35% by mass, and that of the aliphatic hydrocarbons having a carbon number of 3 to 4 was 12% by mass. Measurement results are shown in Table 4.

(Results)

In Example 11 in which the catalyst 6 containing the large-pore zeolite and supporting gallium was used, similarly to Example 3 in which the catalyst supporting gallium was used, the sum of the yield of the monocyclic aromatic hydrocarbons having a carbon number of 6 to 8 and the aliphatic hydrocarbons having a carbon number of 3 to 4 was high, and the yield of the aliphatic hydrocarbons having a carbon number of 3 to 4 was high.

TABLE 4

| | Example 3 | Example 11 |
|---|---|---|
| Kind of zeolite | BEA | BEA |
| Kind of supported metal | Gallium | Zinc |
| Content of zinc or gallium (% by mass) | 0.4 | 0.4 |
| Sum of yield of monocyclic aromatic hydrocarbons having a carbon number of 6 to 8 and aliphatic hydrocarbons having a carbon number of 3 to 4 (% by mass) | 34 | 35 |
| Sum of yield of aliphatic hydrocarbons having a carbon number of 3 to 4 (% by mass) | 14 | 12 |

Example 12

The catalyst 1 was subjected to a hydrothermal treatment under an environment of a treatment temperature of 650° C., a treatment time of 6 hours, and 100% by mass of vapor to obtain a pseudo-degraded catalyst 1 that was hydrothermally degraded in a pseudo manner.

The feedstock was subjected to reaction similarly to Example 1 except that the pseudo-degraded catalyst 1 was used in place of the catalyst 1, and composition analysis of the obtained product was performed to evaluate the catalyst activity after the hydrothermal degradation. In the case of using the pseudo-degraded catalyst 1, the sum of the yield of the monocyclic aromatic hydrocarbons having a carbon number of 6 to 8 and the aliphatic hydrocarbons having a carbon number of 3 to 4 was 15% by mass and that of the aliphatic hydrocarbons having a carbon number of 3 to 4 was 10% by mass. Evaluation results are shown in Table 5.

Example 13

120 g of BEA-type zeolite was impregnated with 120 g of diammonium hydrogen phosphate aqueous solution in order for 2.0% by mass (on the basis of 100% by mass of the total mass of the crystalline aluminosilicate) of phosphorus to be supported, and then the resultant product was dried at 120° C. Then, the resultant dried product was baked under a stream of air at a high temperature of 780° C. for 3 hours, whereby phosphorus-supporting crystalline aluminosilicate was obtained. This phosphorus-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 7 was obtained.

In addition, the catalyst 7 was subjected to a hydrothermal treatment under an environment of a treatment temperature of 650° C., a treatment time of 6 hours, and 100% by mass of vapor to obtain a pseudo-degraded catalyst 7 that was hydrothermally degraded in a pseudo manner.

The feedstock was subjected to reaction similarly to Example 1 except that the pseudo-degraded catalyst 7 was used in place of the catalyst 1, and composition analysis of the obtained product was performed to evaluate the catalyst activity after the hydrothermal degradation. In the case of using the pseudo-degraded catalyst 7, the sum of the yield of the monocyclic aromatic hydrocarbons having a carbon number of 6 to 8 and the aliphatic hydrocarbons having a carbon number of 3 to 4 was 30% by mass and that of the aliphatic hydrocarbons having a carbon number of 3 to 4 was 14% by mass. Evaluation results are shown in Table 5.

(Preparation of FAU-Type Zeolite)

FAU-type zeolite was prepared as described below according to a hydrothermal synthesis method in the related art.

3 g of sodium aluminate containing 30.0% by mass of $Na_2O$, 44.1% by mass of $Al_2O_3$, and 25.9% by mass of $H_2O$, and 16.4 g of sodium hydroxide containing 77.5% by mass of $Na_2O$ were dissolved in 131 ml of deionized water. This resultant solution was added to 74.5 g of aqueous colloidal silica sol containing 29.5% by mass of silica, and these two solutions were mixed, thereby obtaining a reaction mixture having a composition (in terms of molar ratio of oxides) of 16.9 $Na_2O$—$Al_2O_3$-28.2 $SiO_2$-808 $H_2O$. This mixture was mixed and stirred until it reached a uniform state, and this reaction mixture was placed in a 0.3 L autoclave, and was heated at 120° C. for 3 hours. The obtained product was separated from the mother liquor and the separated product was cleaned with distilled water. From a result of X-ray diffraction analysis (apparatus model: Rigaku RINT-2500V) on the product, FAU-type zeolite (Y-type zeolite) was confirmed from XRD patterns.

Then, after being subjected to ion-exchange using ammonium nitrate aqueous solution (30% by mass), the FAU-type zeolite was baked at 550° C. for 3 hours, whereby proton-type FAU zeolite was obtained. Then, this FAU-type zeolite was treated under vapor at a temperature of 650° C. to stabilize this zeolite, whereby stabilized proton-type FAU zeolite (USY zeolite) was prepared.

Example 14

The proton-type FAU zeolite that was prepared as the catalyst was tablet-molded while applying a pressure of 39.2 MPa (400 kgf), and then the resultant tablets were coarsely crushed to have a uniform size of 20 to 28 mesh, whereby a granulated catalyst 8 was obtained.

In addition, the catalyst 8 was subjected to a hydrothermal treatment under an environment of a treatment temperature of 650° C., a treatment time of 6 hours, and 100% by mass of vapor to obtain a pseudo-degraded catalyst 8 that was hydrothermally degraded in a pseudo manner.

The feedstock was subjected to reaction similarly to Example 1 except that the pseudo-degraded catalyst 8 was used in place of the catalyst 1, and composition analysis of the obtained product was performed to evaluate the catalyst activity after the hydrothermal degradation. In the case of using the pseudo-degraded catalyst 8, the sum of the yield of the monocyclic aromatic hydrocarbons having a carbon number of 6 to 8 and the aliphatic hydrocarbons having a carbon number of 3 to 4 was 13% by mass and that of the aliphatic hydrocarbons having a carbon number of 3 to 4 was 9% by mass. Evaluation results are shown in Table 5.

Example 15

120 g of FAU-type zeolite was impregnated with 120 g of diammonium hydrogen phosphate aqueous solution in order for 2.0% by mass (on the basis of 100% by mass of the total mass of the crystalline aluminosilicate) of phosphorus to be supported, and then the resultant product was dried at 120° C. Then, the resultant dried product was baked under a stream of air at a high temperature of 780° C. for 3 hours, whereby phosphorus-supporting crystalline aluminosilicate was obtained. This phosphorus-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 9 was obtained.

In addition, the catalyst 9 was subjected to a hydrothermal treatment under an environment of a treatment temperature of 650° C., a treatment time of 6 hours, and 100% by mass of vapor to obtain a pseudo-degraded catalyst 9 that was hydrothermally degraded in a pseudo manner.

The feedstock was subjected to reaction similarly to Example 1 except that the pseudo-degraded catalyst 9 was used in place of the catalyst 1, and composition analysis of the obtained product was performed to evaluate the catalyst activity after the hydrothermal degradation. In the case of using the pseudo-degraded catalyst 9, the sum of the yield of the monocyclic aromatic hydrocarbons having a carbon number of 6 to 8 and the aliphatic hydrocarbons having a carbon number of 3 to 4 was 29% by mass and that of the aliphatic hydrocarbons having a carbon number of 3 to 4 was 10% by mass. Evaluation results are shown in Table 5.

(Preparation of MOR-Type Zeolite)

MOR-type zeolite was prepared as described below according to a hydrothermal synthesis method in the related art. 2.7 g of sodium aluminate containing 30.0% by mass of $Na_2O$, 44.1% by mass of $Al_2O_3$, and 25.9% by mass of $H_2O$, and 6.3 g of sodium hydroxide were dissolved in 200 ml of deionized water. This resultant solution was added to 241 cc of aqueous colloidal silica sol containing 27.8% by mass of silica, thereby obtaining a reaction mixture having a composition (in terms of molar ratio of oxides) of 1.9 $Na_2O$—$Al_2O_3$-13 $SiO_2$. This mixture was mixed and stirred until it reached a uniform state, and this reaction mixture was placed in a 0.3 L autoclave, and was heated at 150° C. for 8 hours. The obtained product was separated from the mother liquor and the separated product was cleaned with distilled water. From a result of X-ray diffraction analysis (apparatus model: Rigaku RINT-2500V) on the product, MOR-type zeolite was confirmed from XRD patterns.

Then, after being subjected to ion-exchange using ammonium nitrate aqueous solution (30% by mass), the MOR-type zeolite was baked at 550° C. for 3 hours, whereby proton-type MOR zeolite was obtained. Then, this MOR zeolite was treated under vapor at a temperature of 650° C. to stabilize this zeolite, whereby stabilized proton-type MOR zeolite was prepared.

Example 16

The proton-type MOR zeolite that was prepared as the catalyst was tablet-molded while applying a pressure of 39.2 MPa (400 kgf), and then the resultant tablets were coarsely crushed to have a uniform size of 20 to 28 mesh, whereby a granulated catalyst 10 was obtained.

In addition, the catalyst 10 was subjected to a hydrothermal treatment under an environment of a treatment temperature of 650° C., a treatment time of 6 hours, and 100% by mass of vapor to obtain a pseudo-degraded catalyst 10 that was hydrothermally degraded in a pseudo manner.

of the monocyclic aromatic hydrocarbons having a carbon number of 6 to 8 and the aliphatic hydrocarbons having a carbon number of 3 to 4 was 30% by mass and that of the aliphatic hydrocarbons having a carbon number of 3 to 4 was 11% by mass. Evaluation results are shown in Table 5.

TABLE 5

|  | Example 12 | Example 13 | Example 14 | Example 15 | Example 16 | Example 17 |
|---|---|---|---|---|---|---|
| Catalyst | Pseudo-degraded catalyst 1 | Pseudo-degraded catalyst 7 | Pseudo-degraded catalyst 8 | Pseudo-degraded catalyst 9 | Pseudo-degraded catalyst 10 | Pseudo-degraded catalyst 11 |
| Kind of Zeolite | BEA | BEA | FAU | FAU | MOR | MOR |
| Amount of phosphorus | 0 | 2 | 0 | 2 | 0 | 2 |
| Sum of yield of monocyclic aromatic hydrocarbons having a carbon number of 6 to 8 and aliphatic hydrocarbons having a carbon number of 3 to 4 (% by mass) | 15 | 30 | 13 | 29 | 14 | 30 |
| Yield of aliphatic hydrocarbons having a carbon number of 3 to 4 (% by mass) | 10 | 14 | 9 | 10 | 10 | 11 |

The feedstock was subjected to reaction similarly to Example 1 except that the pseudo-degraded catalyst 10 was used in place of the catalyst 1, and composition analysis of the obtained product was performed to evaluate the catalyst activity after the hydrothermal degradation. In the case of using the pseudo-degraded catalyst 10, the sum of the yield of the monocyclic aromatic hydrocarbons having a carbon number of 6 to 8 and the aliphatic hydrocarbons having a carbon number of 3 to 4 was 14% by mass and that of the aliphatic hydrocarbons having a carbon number of 3 to 4 was 10% by mass. Evaluation results are shown in Table 5.

Example 17

120 g of MOR-type zeolite was impregnated with 120 g of phosphoric acid aqueous solution in order for 2.0% by mass (on the basis of 100% by mass of the total mass of the crystalline aluminosilicate) of phosphorus to be supported, and then the resultant product was dried at 120° C. Then, the resultant dried product was baked under a stream of air at a high temperature of 780° C. for 3 hours, whereby phosphorus-supporting crystalline aluminosilicate was obtained. This phosphorus-supporting crystalline aluminosilicate was tablet-molded while applying a pressure of 39.2 MPa (400 kgf), and then the resultant tablets were coarsely crushed to have a uniform size of 20 to 28 mesh, whereby a granulated catalyst 11 was obtained.

In addition, the catalyst 11 was subjected to a hydrothermal treatment under an environment of a treatment temperature of 650° C., a treatment time of 6 hours, and 100% by mass of vapor to obtain a pseudo-degraded catalyst 11 that was hydrothermally degraded in a pseudo manner.

The feedstock was subjected to reaction similarly to Example 1 except that the pseudo-degraded catalyst 11 was used in place of the catalyst 1, and composition analysis of the obtained product was performed to evaluate the catalyst activity after the hydrothermal degradation. In the case of using the pseudo-degraded catalyst 11, the sum of the yield (Results)

Even in the case of using the catalyst containing the MOR-type zeolite or the FAU-type zeolite, which is a large-pore zeolite, substantially the same effect as the case of using the catalyst containing the BEA-type zeolite was exhibited.

Furthermore, when phosphorus was incorporated in the catalyst, even after the pseudo-degradation, the sum of the monocyclic aromatic hydrocarbons having a carbon number of 6 to 8 and the aliphatic hydrocarbons having a carbon number of 3 to 4, and the aliphatic hydrocarbons having a carbon number of 3 to 4 were obtained with high yield.

INDUSTRIAL APPLICABILITY

According to the catalyst for production of hydrocarbons of the invention, monocyclic aromatic hydrocarbons having a carbon number of 6 to 8 and aliphatic hydrocarbons having a carbon number of 3 to 4 may be produced with high efficiency from feedstock in which a 10 vol % distillation temperature is 140° C. or higher and a 90 vol % distillation temperature is 380° C. or lower.

The invention claimed is:

1. A catalyst for production of hydrocarbons including monocyclic aromatic hydrocarbons having a carbon number of 6 to 8 and aliphatic hydrocarbons having a carbon number of 3 to 4 from feedstock in which a 10 vol % distillation temperature is 140° C. or higher and a 90 vol % distillation temperature is 380° C. or lower, the catalyst comprising phosphorus, a crystalline aluminosilicate comprising a large-pore BEA-type zeolite having a 12-membered ring structure, and a binder;

wherein an amount of phosphorus with respect to the total weight of the catalyst is 0.1 by mass to 10% by mass, wherein an amount of phosphorus supported on the crystalline aluminosilicate is 0.1% by mass or more and 5.0% by mass or less based on 100% by mass of a total mass of the crystalline aluminosilicate, and wherein when the catalyst is subjected to a hydrothermal treatment at a treatment temperature of 650° C., a treatment time of 6 hours, and 100% by mass of vapor, a sum of a yield of the monocyclic aromatic hydrocarbons having a carbon number of 6 to 8 and the aliphatic hydrocarbons having a carbon number of 3 to 4 is 30% by mass or more and a yield of the aliphatic hydrocarbons having a carbon number of 3 to 4 is 14% by mass or more.

2. The catalyst for production of hydrocarbons according to claim 1, wherein the amount of phosphorus supported on the crystalline aluminosilicate is 0.2% by mass or more and 3.0% by mass or less.

3. The catalyst for production of hydrocarbons according to claim 1, further comprising boron;
wherein an amount of boron supported on the crystalline aluminosilicate is 0.1% by mass or more and 5.0% by mass or less based on 100% by mass of the crystalline aluminosilicate.

4. The catalyst for production of hydrocarbons according to claim 1, further comprising one or more element selected from gallium and zinc.

5. The catalyst for production of hydrocarbons according to claim 4, wherein an amount of gallium and/or zinc is 0.01% by mass or more and 5.0% by mass or less based on 100% by mass of the crystalline aluminosilicate.

* * * * *